No. 715,596. Patented Dec. 9, 1902.
L. G. NILSON.
DRIVING MECHANISM FOR VEHICLES.
(Application filed May 14, 1902.)
(No Model.)

WITNESSES:
Edward Thorpe
C. R. Ferguson

INVENTOR
Lars G. Nilson
BY Munn
ATTORNEYS.

UNITED STATES PATENT OFFICE.

LARS G. NILSON, OF NEW YORK, N. Y., ASSIGNOR TO SIEGFRIED M. FISCHER AND HARRY S. FISCHER, OF NEW YORK, N. Y., AND HULDAH ANDERSON, OF DES MOINES, IOWA.

DRIVING MECHANISM FOR VEHICLES.

SPECIFICATION forming part of Letters Patent No. 715,596, dated December 9, 1902.

Application filed May 14, 1902. Serial No. 107,242. (No model.)

*To all whom it may concern:*

Be it known that I, LARS G. NILSON, a citizen of the United States, and a resident of the city of New York, borough of Manhattan, in the county and State of New York, have invented a new and Improved Driving Mechanism for Vehicles, of which the following is a full, clear, and exact description.

This invention relates particularly to driving mechanism for electric automobiles. It is a common practice to place the driving-gearing, such as chains or spur-gears, directly on the spokes or very close to the drive-wheels, the disadvantage of which is that such gearings catch considerable sand or grit that may fall from the wheels, causing the gearing to wear out quickly, and it is practically impossible to properly incase such gearing.

The object of the present invention is to overcome the above-mentioned difficulties by so arranging the parts that the driving mechanism is placed between the body-supporting springs and remote from the wheels and completely incased.

I will describe a driving mechanism for vehicles embodying my invention and then point out the novel features in the appended claim.

Reference is to be had to the accompanying drawings, forming a part of this specification, in which similar characters of reference indicate corresponding parts in both the figures.

Figure 1:
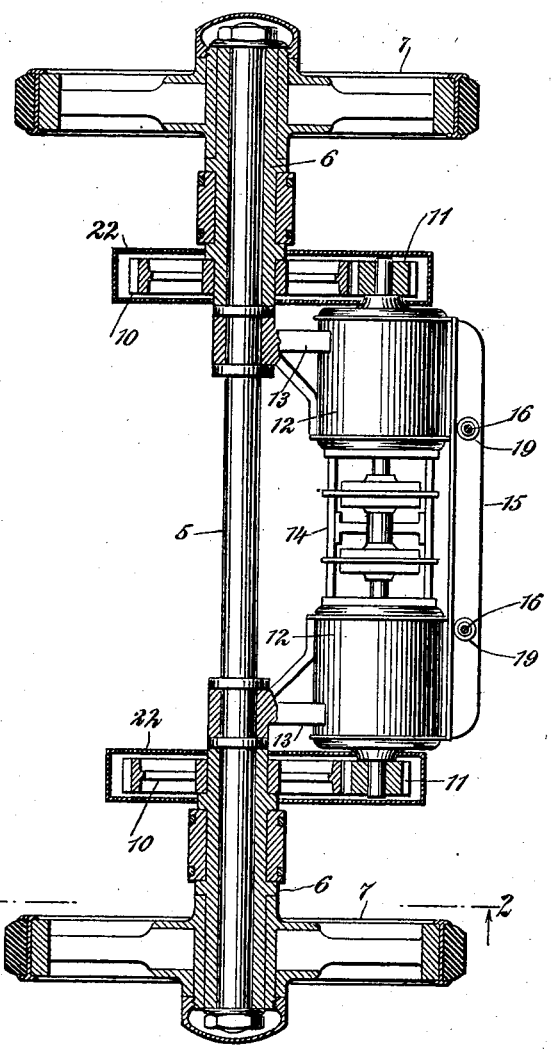
Figure 2:
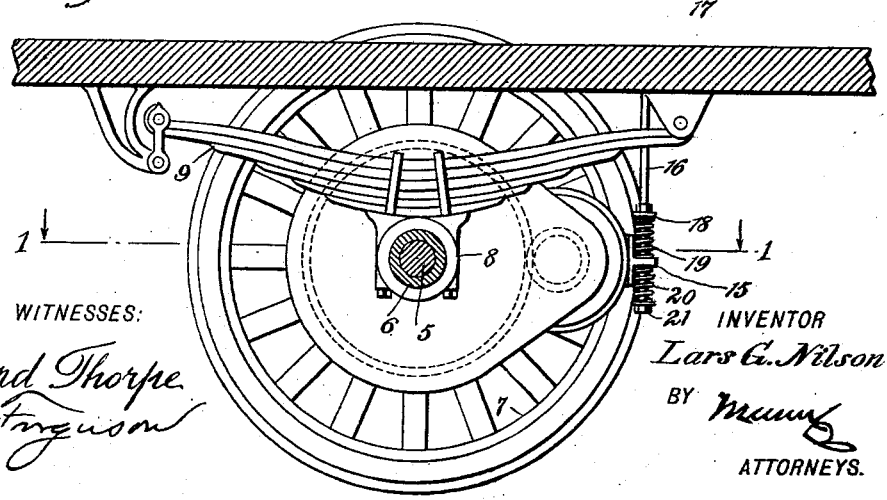

Figure 1 is a section on the line 1 1 of Fig. 2 of a driving mechanism for vehicles embodying my invention, and Fig. 2 is a section on the line 2 2 of Fig. 1.

Referring to the drawings, 5 designates an axle, on which the hubs 6 of the driving-wheels 7 are mounted to rotate. These hubs 6 are substantially in the form of sleeves and extend to a considerable distance inward on the axle, and the hubs have bearings in the clips or saddles 8, to which the body-supporting springs 9 are attached. Attached to the hubs at the inner sides of the springs are gear-wheels 10, which engage with pinions 11 on the shafts of the motors 12. It will be noted that two electric motors are provided for the driving mechanism—that is, one motor for each driving-wheel—and these motors are supported by brackets 13, mounted to swing slightly on the axle 5, and arranged between the motors is a frame 14, in which bearings for the shafts are arranged. Also attached to the field-casings of the motors is a bar 15, having bearings through which rods 16 pass, the upper ends of these rods being connected to the body 17 of the vehicle, and arranged between the bar and collars 18 on said rods are springs 19, and springs 20 are arranged between the lower sides of said bar and collars or nuts 21 on the lower ends of the rods. These springs form cushions to prevent jar of the motors while the vehicle is moving.

The gears 10 and 11 are inclosed by casings 22, so that dirt or grit is prevented from reaching the same.

As the axle 5 is left free to revolve inside of the hubs 6, as well as within the brackets 13, it may revolve partially with one wheel or both wheels or remain stationary in the bearings, according to the friction. This gives a great flexibility so far as avoiding trouble due to poor lubrication goes, as the axle might be stuck fast in any one of the bearings without affecting the general operation of the vehicle.

Having thus described my invention, I claim as new and desire to secure by Letters Patent—

In a driving mechanism for vehicles, an axle, elongated hubs mounted to rotate on the axle, bearings for said hubs, springs supported by the bearings, gear-wheels attached to the hubs at the inner sides of the springs, independent motors having swinging connection with the axle at the inner ends of the hubs, pinions on the motor-shafts and engaging with said gear-wheels, casings inclosing the gear-wheels and pinions, and a frame connecting the two motor-casings and in which the inner ends of the motor-shafts have bearings.

In testimony whereof I have signed my name to this specification in the presence of two subscribing witnesses.

LARS G. NILSON.

Witnesses:
JNO. M. RITTER,
C. R. FERGUSON.